T. J. CROWE.
SPRING WHEEL.
APPLICATION FILED JAN. 18, 1913.
1,094,308.
Patented Apr. 21, 1914.
2 SHEETS—SHEET 1.
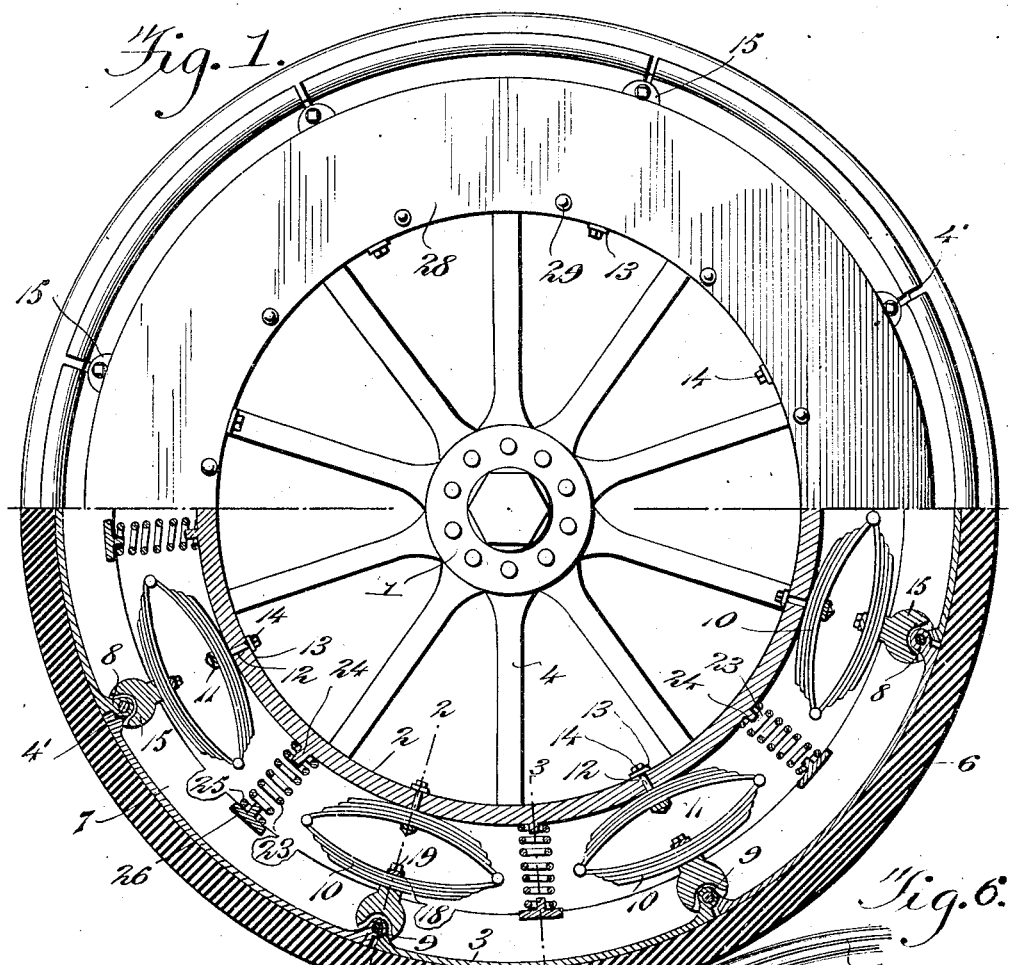
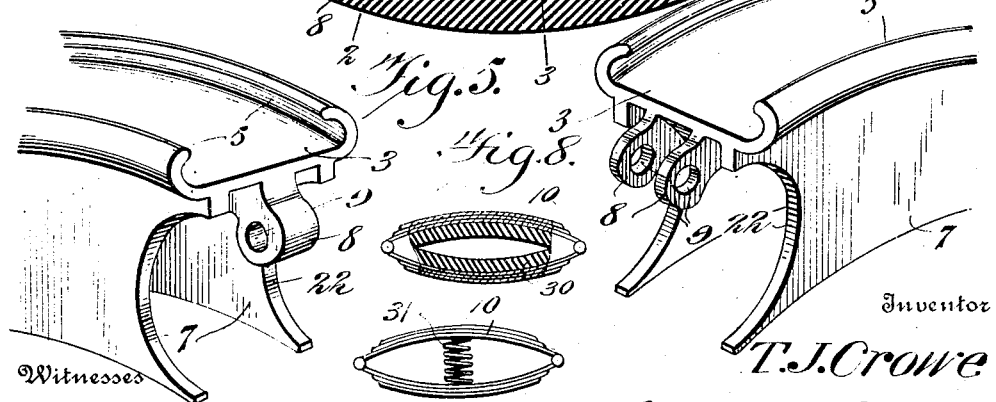
Inventor
T. J. Crowe
By Victor J. Evans
Attorney
Witnesses
W. S. McDowell
P. M. Smith

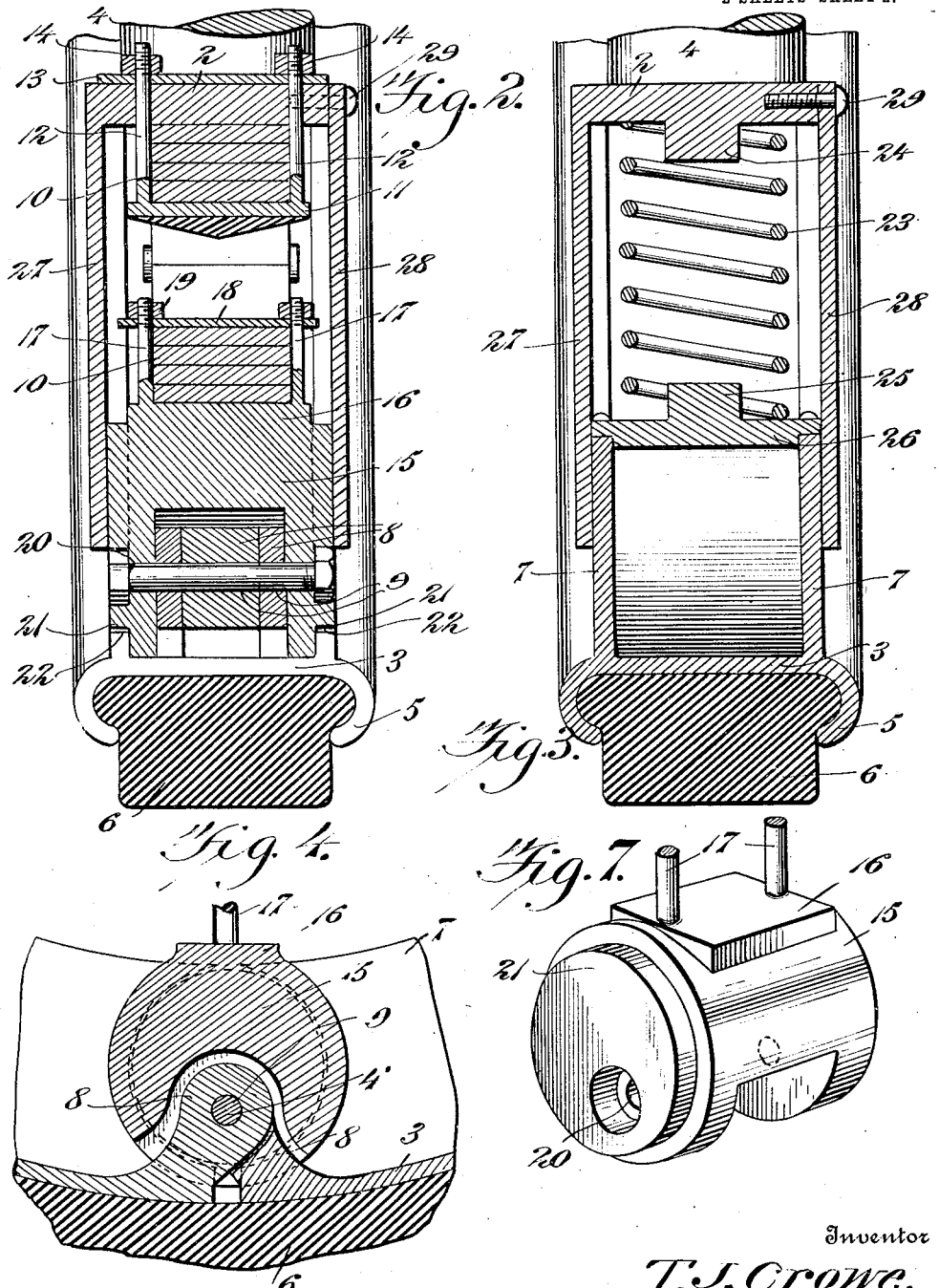

UNITED STATES PATENT OFFICE.

THOMAS J. CROWE, OF DALLAS, TEXAS.

SPRING-WHEEL.

1,094,308. Specification of Letters Patent. Patented Apr. 21, 1914.

Application filed January 18, 1913. Serial No. 742,875.

*To all whom it may concern:*

Be it known that I, THOMAS J. CROWE, a citizen of the United States, residing at Dallas, in the county of Dallas and State of Texas, have invented new and useful Improvements in Spring-Wheels, of which the following is a specification.

This invention relates to spring wheels for use on automobiles and other vehicles, such as motorcycles, and motor trucks, the object in view being to provide a wheel, the construction of which will dispense with the necessity of using a pneumatic tire, and at the same time provide for the necessary resiliency in the wheel itself to absorb all jar and vibration, and prevent the transmission of the same to the axles and body of the vehicle.

The tire supporting element of the spring wheel is made up of a plurality of pivotally connected sections which have a play relatively to each other and to the hub of the wheel, and it is one of the objects of the present invention to provide a special form of joint between the meeting ends of said sections, whereby dirt, grit and other foreign matter will be excluded at such joints.

A further object of the invention is to provide, in connection with an inner fixed rim and an outer tire supporting rim made up in sections as hereinabove referred to, supporting springs which have a novel connection with the sectional outer rim by being attached to the knuckles which form a part of the joint and serve as closures for sealing the joints between the meeting ends of the outer rim sections.

With the above and other objects in view, the invention consists in the construction, combination and arrangement of parts, as will be hereinafter more fully described, illustrated in the accompanying drawings, and pointed out in the claims hereunto appended.

In the drawings: Figure 1 is a side elevation of a wheel, partly in section, embodying the present invention. Fig. 2 is a cross section through the same on an enlarged scale taken on the line 2—2 of Fig. 1. Fig. 3 is a similar cross section taken on the line 3—3 of Fig. 1. Fig. 4 is a detail longitudinal section, showing the relation between the outer rim sections and the spring carried knuckles. Fig. 5 is a detail perspective view of the end portion of one of the outer rim sections. Fig. 6 is a similar view of the end of the adjoining rim section. Fig. 7 is an enlarged detail perspective view of the combined spring support, knuckle and joint closure. Fig. 8 is a detail view of one of the elliptic springs, showing a rubber buffer or cushion therein. Fig. 9 is a similar view, showing a buffer spring in lieu of the cushion.

The wheel contemplated in this invention embodies a hub 1, an inner fixed rim 2, an outer sectional rim 3, and spokes 4 connecting the hub 1 rigidly with the inner fixed rim 2, the outer rim 3 being yieldingly mounted and supported, so as to have radial and longitudinal play with respect to the inner rim and hub of the wheel, as hereinafter particularly described.

The outer rim 3 is made up of a circular series of sections pivotally connected together by pivot bolts 4', one of said sections being illustrated in Fig. 5, and another adjoining section in Fig. 6, wherein it will be observed that the rim sections are provided with the inturned clencher flanges 5 adapted to engage and retain in position a tire 6 of rubber or any other suitable material. In addition to the channeled portion, each section of the outer rim is provided with parallel inwardly extending flanges 7 spaced a suitable distance apart and having their ends cut away in semi-circular form, as shown in Figs. 5 and 6, to receive the pivot knuckle hereinafter referred to. Each of the rim sections is also provided with the fixedly attached knuckles 8 provided with alining openings 9 therein, through which one of the pivot bolts 4' referred to hereinabove is inserted, and by means of which all of the outer rim sections are pivotally connected together, allowing them to play inwardly and outwardly to accommodate themselves to any inequalities or rough places in the roadway over which the machine is traveling.

Interposed between the outer and inner rims are elliptic springs 10 which are secured to the inner rim by U-shaped clips 11, the body portion of each clip passing over the central portion of the adjacent elliptic spring, and embodying the inwardly extending threaded shanks 12 which embrace the side edges of the inner rim, and over which is placed a washer plate 13 held in position by nuts 14. Between the meeting ends of the sections and forming a portion of each joint thereof is a hinged knuckle 15 which is substantially cylindrical in outer contour, as shown in the detail view Fig. 7, and also in the sectional view Fig. 4, said pivot knuckle being provided at its inner side with a flat face 16 forming a spring seat which bears against the outer side of the adjacent elliptic spring 10, as shown in Fig. 1. Extending inwardly from the face 16 are parallel bolts or shanks 17, the inner ends of which are threaded and receive a washer plate 18 secured by nuts 19. Each pivot knuckle 15 is further provided with an eccentric hole 20 extending through the same from end to end to receive one of the pivot bolts 4', and the ends of the hole 20 are countersunk to receive the head and nut of such bolt, which thus lie flush within the opposite faces of the knuckle, thereby doing away with any projection which would interfere with the movement of the flanges with which the inner fixed rim 2 is provided. Each end of the pivot knuckle 15 is also reduced or rabbeted, as shown at 21, and the reduced portions of said knuckle fit within the semi-circular recesses 22 in the flanges 7 of the outer rim sections, thereby producing an overlapping relation between the flanges 7 and the pivot knuckle which effectively prevents the admission of dust, dirt, mud, and other foreign matter to the different parts of the joint.

From the foregoing description, it will be observed that the pivot knuckles 15 play in the spaces between the adjacent ends of the abutting sections of the outer rim, and each pivot knuckle 15, together with the knuckles 8 on the rim sections, is connected by a common pivot bolt 4'.

Auxiliary springs 23 are interposed between the inner and outer rims, the inner ends of said springs, which are of the coiled expansion type, fitting around studs 24 projecting from the outer face of the inner rim, and the outer ends of said springs being held by inwardly extending pins 25 on cross bars or webs 26 connecting the flanges 7 on the outer rim sections. The auxiliary springs 19 alternate with the elliptic springs and are arranged in the spaces between the elliptic springs.

As best illustrated in Figs. 2 and 3, the inner fixed rim 2 is provided with side plates or flanges 27 and 28, the flange 27 being preferably formed as an integral part of the rim 2, and the flange 28 being formed as a separable part of the rim and being secured thereto by means of screws 29, or their equivalent. This enables one of the rim flanges to be removed, in order to give access to the springs and other parts contained between the flanges. The flanges 27 and 28 ride against the outside faces of the flanges 7 of the outer rim sections and serve to guard against the admission of dirt and other foreign matter, as the two rims play relatively to each other.

It will be seen that the outer rim is made up of a circular series of sections, all capable of independent sliding movement, so as to absorb the jar and vibration ordinarily imparted to the axle while traveling over rough roads. An additional advantage resulting from the construction above set forth resides in the fact that in case of breakage of any spring or outer rim section, said spring or section may be removed, without disturbing or disarranging the remaining sections therein, and a new section may be substituted in place of the injured one. The outer rim sections may be detached from each other at any desired point by removing the appropriate pivot bolt 4'.

In vehicle wheels which are adapted to be heavily loaded and subjected to unusual shocks and strains, such as motor trucks and commercial vehicles generally, a rubber buffer or cushion 30 may be interposed between the outer and inner sections of the spring, as shown in Fig. 8, so that as the spring closes, the end portions of the rubber cushion, which is generally elliptic in shape, as shown in Fig. 8, will be compressed together, and as the load increases, the opposite portions of the rubber cushion will close entirely together and support the opposite portions of the spring and prevent breakage thereof.

In lieu of the rubber cushion illustrated in Fig. 8, a coiled expansion spring 31 may be introduced between the outer and inner portions of the elliptic spring, as shown in Fig. 9, said spring 31, when closed, serving as a check or stop for the opposite portions of the elliptic springs and preventing fracture of the latter.

What is claimed is:

1. In a spring wheel, an inner fixed rim, an outer rim composed of a circular series of sections and provided with inwardly extending flanges, overlapping ears at the adjacent ends of said sections, pivot bolts passing through said ears, the inwardly extending flanges of said sections being cut away in substantially semi-circular shape, a cylindrical closure having rabbeted ends in which the cut away portions of said flanges work in their pivotal movement on said bolt, and springs fastened at one end to said closures and at their opposite ends to the fixed inner rim.

2. In a spring wheel, an inner fixed rim, side flanges thereon, one of which is removable, an outer rim composed of pivotally connected sections having inwardly extending flanges which slide against the inner surface of the inner rim flanges, said outer rim sections being channeled to receive the tire, cross webs connecting the flanges of the outer rim sections between the joints of the outer rim, full elliptic springs interposed between the outer and inner rims and fastened to the inner rim, spring holding knuckles journaled on the pivot bolts connecting the outer rim sections and having said elliptic springs secured thereto, and auxiliary coiled springs interposed between the inner rim and the cross webs of the outer rim.

In testimony whereof I affix my signature in presence of two witnesses.

THOMAS J. CROWE.

Witnesses:
 MACK E. PHILLIPS,
 MRS. A. J. BEDELL.